United States Patent [19]

Cumpston

[11] 4,020,994
[45] May 3, 1977

[54] METHOD OF CORRELATING THE ROTOR AND STATOR IN A MIXER-REFINER-REACTOR

[76] Inventor: Edward H. Cumpston, 43 Monument Ave., Old Bennington, Vt. 05201

[22] Filed: Jan. 28, 1976

[21] Appl. No.: 653,072

[52] U.S. Cl. .................................. 241/30; 241/260
[51] Int. Cl.² .......................................... B02C 7/12
[58] Field of Search ............................ 241/30, 260

[56] References Cited

UNITED STATES PATENTS 3,806,050    4/1974    Cumpston, Jr. .................... 241/260

Primary Examiner—Granville Y. Custer, Jr.
Attorney, Agent, or Firm—Stonebraker, Shepard & Stephens

[57] ABSTRACT

The invention is a method of correlating the stator and rotor in a mixer-refiner-reactor of the type shown in U.S. Pat. No. 3,806,050. The mixer is set up originally with an estimated correlation between the stator and the rotor by establishing the total working area of discrete raised bars in the rotor and stator and by establishing the stator bar height, the radial gap between the rotor bars and the inside surface of the stator, and the proportion of predominance of feed bars in the stator. The material to be processed is then input into the mixer, and the power consumption is monitored. Depending on the results, the stator bars are then changed according to selected relationships to increase or decrease the rotor penetration of the layer of material formed around the stator in response to a given rate of input of material. The objectives are to form a continuous layer of material around the stator with a sufficient rotor working depth in response to the input rate so that the rotor bars engaging and moving through the material consume power in proportion to the input rate and move the layer of material through the stator bars.

8 Claims, 9 Drawing Figures

METHOD OF CORRELATING THE ROTOR AND STATOR IN A MIXER-REFINER-REACTOR

BACKGROUND OF THE INVENTION

The invention applies to a mixer-refiner-reactor of the type disclosed in U.S. Pat. No. 3,806,050, and all the information disclosed in that patent is incorporated herein by reference. The mixer was initially developed for refining cellulose fibers in a relatively thick slurry, and it worked well for that purpose and for several other mixing and refining jobs. As more and more different materials were attempted to be processed, including much less flowable materials, some surprising failures occurred, and these led to adjustments that usually converted failures to successes. In effect, experience showed that the mixer operated differently from any previously known mixer, so that its adaptation to processing different materials required considerable effort. The experience produced much information on the results that can be expected, and led to a better understanding and clearer insight on how the mixer operates and how it can be adjusted to process different materials.

The invention aims at efficient and successful adaptation of a mixer-refiner-reactor for processing different materials for different purposes. The inventive method also seeks more extensive application of the machine to a wider range of material processing for as many industrial uses as possible and to achieve results unobtainable with prior art mixing methods.

SUMMARY OF THE INVENTION

One thing learned in experience with the mixer-refiner-reactor is that the rotor and the stator have to be correlated relative to a particular material. This is generally accomplished by setting up the mixer according to an original estimate of the proper correlation, and then adjusting the stator or the flowability of the material after a trial run. The method includes use of relationships to guide the making of such adjustments so that after a trial run, both the type of adjustment and the direction of adjustment can be determined. By following the inventive method, it should be possible to adapt the machine for processing a multitude of materials beyond the many materials already successfully processed.

The inventive method recognizes that the rotor of a mixer-refiner-reactor forms the material to be worked into a continuous layer around the stator and applies working energy to the material layer under the control or regulation of the stator. Each increment of material input to the machine temporarily thickens the layer and forces the rotor bars to dig into and move through the thickened portion of the layer. A given input rate thus established a rotor bar working depth, and the rotor applies working energy to the material in proportion to both the rotor working depth and the input rate.

The correlation between the rotor and stator partially involves the configuration and arrangement of raised bars in the rotor and stator, and the bars can be considered as having a total working area involving bar dimensions, bar surface smoothness, and angles of inclination of bars as explained more fully below.

More specifically, the rotor is formed with discrete bars of a total working area estimated as appropriate for forming the material into a continuous layer around the stator, giving the rotor bars a sufficient grip to move the layer of material generally circumferentially around the stator as a function of the rotor working depth and the input rate, and making the rotor bars move through the layer of material as the layer of material moves. The stator is formed with discrete bars oriented to establish a proportion of predominance of feed bars for advancing the material from the input to the output as the circumferential movement of the layer of material occurs. The stator is also formed with an amount of radial gap between the rotor bars and the inside surface of the stator and with bars of a total working area and height for resisting the circumferential movement of the layer of material sufficiently so that, in response to the rate of input of the material, the rotor working depth is sufficient to require the rotor bars to apply working energy to the material.

The rotor is then driven, the material is input, and the power consumed is monitored as evidence of the work done by the rotor on the layer of material. Depending on the results, the stator bars are changed by using at least one of several relationships responsive to the rate of input of material into the machine and including: (a) increasing the total working area of the stator bars increases the rotor working depth; (b) increasing the height of the stator bars increases the rotor working depth; (c) increasing the radial gap between the rotor bars and the inside surface of the stator increases the rotor working depth; and (d) decreasing the proportion of predominance of feed bars in the stator increases the rotor working depth. The bar changes are made to increase the rotor working depth if the consumed power is inadequate or if the consumed power surges, and to reduce the rotor working depth if the material clogs and the consumed power is excessive or if the consumed power continues after input of material stops. The steps of inputting the material, monitoring the power consumption, and changing the stator bars are continued until the consumed power is proportional to the rate of input of the material, as indicating that the layer of material is moving through the stator bars and the rotor bars are moving through a working depth of the layer of material.

DRAWINGS

DETAILED DESCRIPTION

Figure 1:
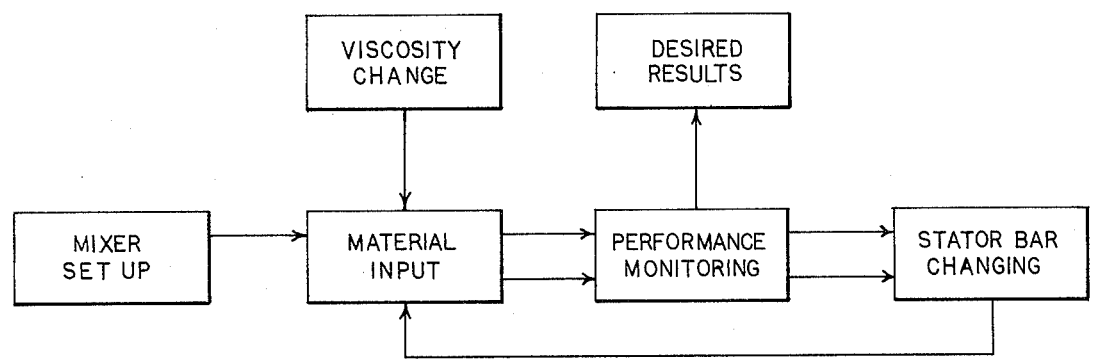
FIG. 1 is a schematic diagram of preferred steps in the inventive method.

U.S. Pat. No. 3,806,050, incorporated herein by reference, explains general construction and operation of a mixer, including the use of discrete bars in the rotor and stator. From that information, a generally coaxial stator and rotor can be constructed and operated for mixing, refining or reacting many materials. As different materials with different characteristics are processed, however, it becomes important to understand how to correlate the stator and the rotor to process any given material. A preferred way of proceeding with this is explained below.

First, the general parameters of the mixer are selected for the expected or desired throughput. For example, the axial length of the machine is preferably about two times the diameter, and the RPM of the rotor is sufficient to keep the material being worked from lodging between the rotor bars. The maximum power is also established relative to the material being worked and the desired throughput rate. The rate and stator bars are configured and arranged as described more fully below to be spaced apart sufficiently to accommodate particles of the material being worked. Many different sizes of machines with different power consumptions and throughput rates are possible for various jobs.

Once the general parameters for the machine have been selected, the rotor is constructed to have discrete bars estimated as appropriate for forming the material into a continuous layer around the stator, giving the rotor bars a sufficient grip on the layer of material to move it generally circumferentially around the stator as a function of the input rate of the material, and making the rotor bars move through the layer of the material as it moves circumferentially. This involves several parameters relative to the rotor bars as explained below.

Before explaining how the mixer-refiner-reactor is initially set up according to the inventive method, it is important to understand some of the principles of operation of the machine. The rotor applies working energy to the material in proportion to the input rate, and the stator generally controls or regulates the process. The rotor turns fast enough to throw the material centrifugally outward into a layer that builds up around the stator, and as initial amounts of material are fed into a clean machine, the rotor immediately forces the material into a ring around the stator. Then as each increment of material is added, it temporarily increases the depth of the layer so that the rotor bars engage the increased depth and force the material outward against the stator. The stator gradually fills with material whereupon continuously added material establishes a rotor bar working depth or penetration into the layer sufficient to require the rotor bars to engage and move through the material. The rotor working depth establishes the amount of energy that the rotor applies to the material, and the working depth is also proportional to the input rate of the material. If the input of material is interrupted, the material is quickly thrown just out of reach of the rotor bars, and resumption of the input of material quickly thickens the layer and requires the rotor to resume working on the material. So the rotor working depth refers to the depth of penetration of the rotor bars into the material, and it is proportional to both the input rate and the power consumed by the rotor.

The configuration and arrangement of bars in the rotor and stator are important to the inventive method and require some preliminary explanation. The term "working area" for the bars of either the rotor or stator is a convenient way of describing several parameters of bar configuration. The working area is generally the amount of frontal surface that the bars present to the material as the rotor bars advance through the material, or as the material approaches the stator bars. However, the smoothness of the bar surfaces also affects how easily the rotor bars can slide through the material, or how readily the material can move through the stator bars, so that surface smoothness is also a factor in the working area of the bars. The bars are preferably inclined obliquely to a plane perpendicular to the axis of the machine so that each bar has a leading end that is first to engage the material and an acutely angled side surface that diverts the material one way or another as relative motion occurs. The greater the inclination of a bar from the plane perpendicular to the machine axis, the greater the working area of the bar, because the working side surface of the bar has an increasingly greater extent at increasingly greater angles. There is a yet-to-be-determined maximum angle at which any bar can operate, however, because too great an angle would prevent the material from moving relative to the bars and would allow the material to lodge between bars and escape being moved about and worked on. This must be avoided to make the machine work.

The working area concept as applied to the stator bars is a function of total bar length, bar height, bar inclination angle, and streamlining or smoothness, and stator bars are especially sensitive to changes in height, as explained more fully below. The inclination angle of the stator bars from a plane perpendicular to the machine axis must be sufficiently small so that the material can slide between the stator bars without clogging. The working area concept as applied to the rotor bars includes the total bar length, bar inclination angle, and smoothness or streamlining, and also the rotor working depth or extent of penetration of the rotor bars into the material as a function of the input rate. The available space between the rotor bars is never completely filled with material during operation, and the rotor bars are always taller than their maximum penetration into the working depth of the material layer. So as the rotor working depth increases, the working area of the rotor bars also increases for greater power consumption and greater application of working energy to the material. The basic concepts of rotor working depth and total bar working area help make the following description of the inventive method more readily understandable.

The rotor bars must be held securely in place to withstand centrifugal forces. They are also preferably easily replaced, because they wear more rapidly than the stator bars, and they are preferably formed of a hard and wear-resistant material. Preferably, the rotor bars are given as large a working area as possible for the material to be worked. The rotor bars must be spaced apart enough to accommodate the largest particles of material to be encountered, and enough to let the material move through the rotor bars without clogging. Giving the rotor bars the maximum possible total working area compatible with the material is most efficient, because it allows the most possible work to be done for the size of the machine.

The rotor bars preferably have a minimum height of about 1.0 cm, and can extend to a much greater height, depending on their fabrication. A little extra height in the rotor bars is preferred to allow for wear that gradually shortens the rotor bars. They need not be formed on interchangeable blocks as suggested in U.S. Pat. No. 3,806,050, but they are preferably easily replaceable.

The rotor bars are preferably longer than they are wide and preferably have a length-to-width aspect ratio of at least 2:1. The rotor bars are also either inclined from a plane perpendicular to the mixer axis or are arranged relative to each other to have an effective inclination angle from a plane perpendicular to the mixer axis to direct material either toward the output or the input as the rotor turns. Inclined rotor bars engage the material with their leading ends and divert the material along their leading side edges in the direction of the inclination to accomplish this, and rotor bars can also be formed as adjacent bar segments axially offset relative to each other to provide an effective bar inclination. The leading bar in each group of offset bars creates a boat-wake effect as it moves through the material, and the succeeding bars are offset along one edge of the boat wake to divert the material either toward the output or the input to produce an effective inclination angle.

Either way, the effective inclination angle produced by arrangement or orientation of the rotor bars is preferably about 15° from a plane perpendicular to the mixer axis. A smaller effective inclination angle tends to reduce both the working area of the rotor bars and the grip of the rotor on the layer of material, and a larger effective inclination angle tends to increase the rotor bar working area and the rotor's grip on the material, up to an angle so large that the rotor bars no longer slip through the material.

The maximum workable inclination angle for the rotor bars has not yet been determined and may vary with different materials, but an effective inclination angle of 15° to the transverse plane is known to work well and is recommended. If too large an effective inclination angle is used for the rotor bars, the material will merely clog or pack in between the rotor bars and revolve with the rotor without being worked on by the rotor bars. This makes the machine inoperable, because the rotor then has such a forceful grip on the material that is spins the entire layer through the stator and out of the machine without working on the material. Slippage of the rotor bars through the material is essential to maintain the layer in the stator so the rotor can apply work energy to the material by bar movement relative to the material.

The rotor is preferably neutral relative to advancing or retarding the material, and this is preferably achieved with rotor bars arranged or oriented to have an equal number of feed and hold inclinations. Neutral bars having no effective inclination toward either hold or feed can also be used in the rotor, but are not preferred. The rotor cannot have a net bar orientation or arrangement for substantially retarding material, and although it is possible for the rotor to have a net bar orientation or arrangement producing a slight feed effect, the feed is preferably controlled by a predominance of feed bars in the stator as explained more fully below.

The effective grip of the rotor bars on the layer of material is predominantly a function of the total working area of the rotor bars moving through the rotor working depth, as explained more fully above. The effective rotor bar angle, the total rotor bar length, and the streamlining and smoothness of the rotor bars, combined with the depth of penetration of the rotor bars into the material results in a total working area for gripping and moving the material layer. The working area of the rotor bars can be varied either by changing the effective inclination of the bars or the total length of the bars, or both, and the rotor is preferably initially formed with bars of a maximum working area suitable for the material to be worked.

The rotor bars also preferably have streamlined forward edges and are preferably sloping along the side edges that encounter or engage the material as the rotor turns. The bars are also preferably smooth surfaced so that the material can slide easily along the rotor bar surfaces and the bars can move through the material without picking material up and carrying it along with the rotor. Generally, there must be no place for material to clog up or hide, so that all material is engaged by the rotor bars and stator bars, and all the material is kept moving as a function of the input rate.

Another important aspect of the rotor is that at least one rotor bar extends across any axial increment of the rotor so there is no place for material to rest without being engaged by a rotor bar.

The rotor's effective grip on the material, to engage the material and sweep it through the stator bars, is generally proportional to the total working area of the rotor bars as previously explained. The rotor bars must be spaced apart sufficiently so that the material can move between the bars, and for chips, aggregate, or relatively large particle size, the spacing between the rotor bars should exceed the largest particle size to be processed. This limits the total working area that can be achieved within the axial extent of the rotor, because the closest practical placement of rotor bars is about 0.5cm for most materials, and is preferably about 1.0cm for many materials. The preferred method is to substantially fill the rotor with bars spaced apart sufficiently to allow relative motion of the material between the rotor bars, but the potential rotor bar working area can be reduced to decrease the rotor's grip. This generally diminishes the amount of work that can be done and the throughput rate that can be accommodated, but it might be advisable for a material that can be easily overworked. Another preferred way of reducing the material-working potential of the mixer is to reduce the total working area between the rotor and the stator, preferably by reducing axial length and diameter.

After the rotor parameters are established, the stator is formed with a diameter and a bar arrangement estimated to correlate properly with the rotor relative to the material in question. One important function of the stator bars is to control the feed of material from the input to the output of the mixer as the layer of material moves circumferentially through the stator bars. This is done with a proportion of predominance of feed bars in the stator, which regulate the advance of the material relative to the circumferential movement.

The stator is also formed with a radial gap between the rotor bars and the inside surface of the stator and with a total bar height and working area estimated as appropriate to resist the circumferential movement of the layer of material. Then, because the material continuously input into the mixer cannot be swept too easily through the stator, the stator forces the material layer to thicken enough so the rotor bars engage and move through a working depth of the material. The stator thus offers resistance to circumferential flow and regulates the advance of the material to establish the rotor working depth in response to the input rate to determine the amount of work done by the rotor bars on the material.

The stator bars wear relatively little compared to the rotor bars and are preferably formed of relatively soft material. They need not necessarily be formed as replaceable blocks as suggested in U.S. Pat. No. 3,806,050, and welding of the stator bars in place is preferred both for simplicity and ease of adjustment. The stator bars, rather than the rotor bars, are adjusted according to the invention as explained below to accomplish the desired results, and stator parameters are generally more influential than rotor parameters in the operation of the mixer. Adjustment of the stator bars is also preferred, because the stator bars do not move and do not create balance problems, are not subjected to centrifugal force, and their softer material allows easier changing of bars.

In proceeding with stator parameters, the material to be processed is first considered. If chips, aggregate, large particles, or lumps are involved, and are not to be broken into smaller particles in the mixer, then the stator bars, as well as the rotor bars, must be spaced apart far enough so that particles of the material can pass between the bars.

The spaces between the stator bars are preferably smooth, and the stator bars are also preferably streamlined and relatively smooth, and preferably have a smooth slope on the edge first engaged by the moving material.

Figure 7:
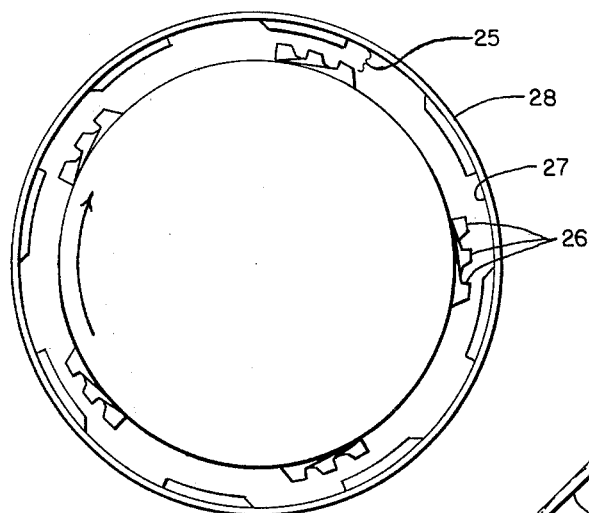
FIG. 7 is a schematic, cross-sectional view of a rotor and stator arranged according to the invention.
Figure 8:
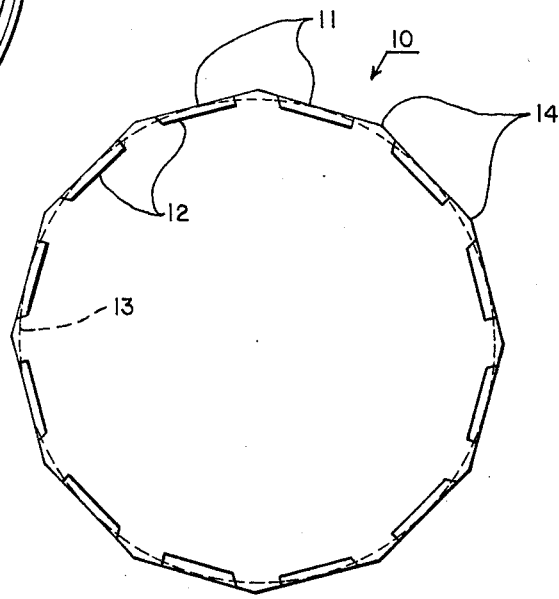
FIG. 8 is a schematic, cross-sectional view of a stator having a polygonal shape.

The radial gap between the inside surface of the stator and the rotor bars helps determine the resistance of the stator to circumferential flow of material. This is best shown in FIG. 7 by the gap 25 between rotor bars 26 and the inside surface 27 of stator 28. The gap 25 is ordinarily 0.5cm to 2.0cm, but it sometimes must be enlarged to accommodate large particles or especially low-viscosity material. Increasing the gap between the rotor bars and the inside surface of the stator necessarily makes a geometric increase in the layer of material by situating the stator radially farther from the rotor. However, in addition to this effect, the thicker layer has a greater resistance to movement so that the rotor working depth also increases and requires deeper penetration of the rotor bars and more power consumption before the rotor achieves a sufficient grip to move the deeper layer.

The stator bar inclination angle, as suggested in U.S. Pat. No. 3,806,050, is preferably 10° from a transverse plane perpendicular to the mixer axis. Bar angles for both the stator and the rotor are ordinarily not adjusted, once they are established, and the stator bar inclination angle of 10° to the transverse plane is known to work well and is recommended. Smaller angles would reduce the bar working area and the material movement resistance of the stator, and larger angles would increase the total bar working area and the material movement resistance up to an angle large enough to be unworkable because of clogging of the material in the stator and keeping it from being moved between the stator bars. The critical maximum angle has not yet been determined, and probably varies with different materials.

Stator bar height is an important element in the total working area of the stator bars, and the stator's resistance to movement of the material layer increases rapidly with increase in the stator bar height. The stator bar height is also related to the stator bar density and is more significant in resisting material flow near the maximum density of stator bars than near the minimum density of stator bars. If the stator is relatively full of bars, a small increase in stator bar height makes a significant increase in the resistance of the stator to movement of the material through the bars. Also, since the stator bars wear relatively little, they are preferably made with the desired height without allowing for a height reduction from wear. The stator bar height or radial extension inward from the inside surface of the stator is preferably from 0.3cm to 1.5cm, with the lower end of the range preferred for most materials. The height of the stator bars is also related to their smoothness and amount of streamlining so that smooth and streamlined stator bars can be slightly higher than relatively rough or abrupt stator bars. Streamlining and smoothing of stator bars is preferred to insure that there is no place in the stator for material to hide and escape being moved through the stator bars and worked on by the rotor bars.

Another requirement of the stator bars is that at least one stator bar must extend across every axial increment of the mixer, so there is no circumferential path within the mixer where the material can rotate with the rotor without encountering at least one stator bar.

The other basic parameter for the total working area of the stator bars is their total length relative to their inclination angle. Assuming that the inclination angle and the bar height are not changed, the total working area is most readily adjusted by increasing or decreasing the number of stator bars to adjust the total bar length in the stator.

Changing the resistance of the stator to flow of material changes the rotor working depth in response to the rate of input of material. In other words, as new material is input into the existing layer, it temporarily increases the depth of the layer as a function of the resistance of the stator to centrifugal movement of the material. If the stator resistance is high, incoming material will increase the rotor working depth more than if the resistance of the stator is lower. As the rotor working depth increases, the rotor bars are required to work harder to penetrate more deeply into the material and move it circumferentially through the stator bars.

The rotor working depth is also affected by the proportion of predominance of feed bars in the stator. For example, if a stator is changed from 100% feed bars to 75% feed bars without altering the total working area of the stator bars, then a larger average amount of circumferential movement of material is required before the material can move from the input to the output. This effectively extends the distance that material must travel from one end of the machine to the other and increases the rotor working depth in response to input of material to increase the power necessary to process material at the same throughput rate.

The stator can be either circular or polygonal in cross section, and an example of a twelve-sided polygonal stator 10 is schematically shown in FIG. 7. This has some advantages in that each sector 11 of stator 10 can be formed of a flat sheet of material, and stator bars 12 can be formed as flat strips secured to sectors 11. The movement resistance of polygonal cross-section stator 10 is larger than the movement resistance of a corresponding stator having a circular cross section with an inside diameter equal to the diameter of circle 13 tangent to the inside surfaces of sectors 11 as illustrated. This is because a little extra radial space occurs at each of the junction lines 14 between sectors 11. So if a polygonal stator is selected, allowance must be made for the necessary increase in movement resistance. Increasing the number of sides of a polygonal stator reduces the extra resistance, and reducing the number of sides increases the extra resistance relative to a corresponding circular cross-section stator.

In establishing stator bars for the initial or trial mixer for a particular material, gap requirements between the rotor bars and the inside surface of the stator and between adjacent stator bars are established, and if the gap requirements are relatively large, such as approaching 2cm, the movement resistance will be relatively high from gap requirements alone. To compensate for large gap requirements, the total working area of stator bars can be kept to a minimum of only one bar across every axial extent of the stator, and the minimum number of stator bars would preferably all feed material to help reduce the rotor working depth. The stator bar height should also be kept low and the stator made circular in cross section, rather than polygonal.

Figure 2:
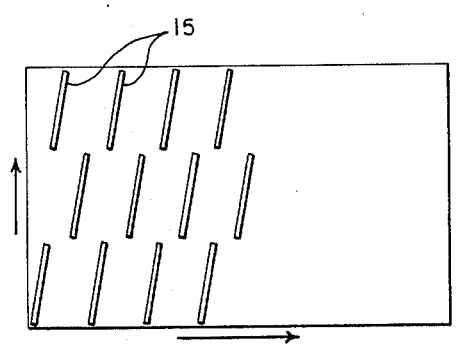
FIGS. 2–6 are schematic views of stators converted to a plane configuration to illustrate possible variations in stator bars.
Figure 3:
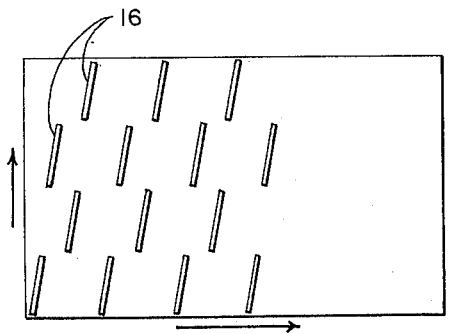
Figure 4:
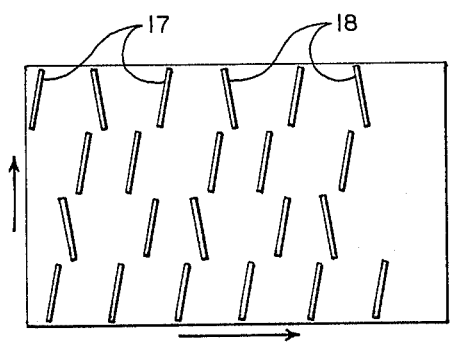
Figure 5:
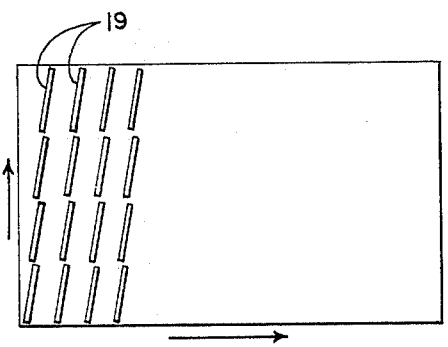
Figure 6:
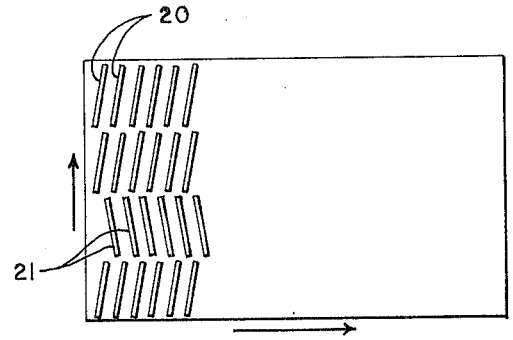

Assuming minimum bar height, the arrangement of FIG. 2 shows minimum stator resistance to material movement with relatively long bars 15 all oriented in the feed direction as indicated by the arrow. The FIG. 3 arrangement of shorter stator bars 16 has the same total bar length and working area as the FIG. 2 arrangement and uses the minimum bar length possible, but has a slightly higher movement resistance by breaking the bars up into smaller and more numerous segments. The arrangement of stator bars as shown in FIG. 4 has the same minimum overall bar length as the arrangements of FIGS. 2 and 3 but increases the working layer by reducing the number of feed bars 17 and introducing a few bars 18 oriented to retard material. This makes the rotor bars work more and penetrate farther into the deeper layer and consume more power. The arrangement of stator bars 19 in FIG. 5 increases the total stator bar length and working area substantially above the minimum to increase the movement resistance and the rotor working depth. The stator bars 20 and 21 as arranged in FIG. 6 have the same total bar length and working area as the stator of FIG. 5, but form a deeper layer because of a row of retard-oriented bars 21.

The original stator bar configuration is generally an estimate based on the characteristics of the material to be worked, and the general parameters of the rotor and stator, such as axial length, diameter, rpm, and desired power and throughput rate expected. Running material through the mixer is relatively easy and quick, so actual trial runs are preferred for each adjustment. The discussion so far involves the first step of mixer setup as shown in the schematic diagram of FIG. 1, and the next step in the inventive method is driving the rotor, inputting material to the mixer, and monitoring the power consumed as explained below.

Figure 9:
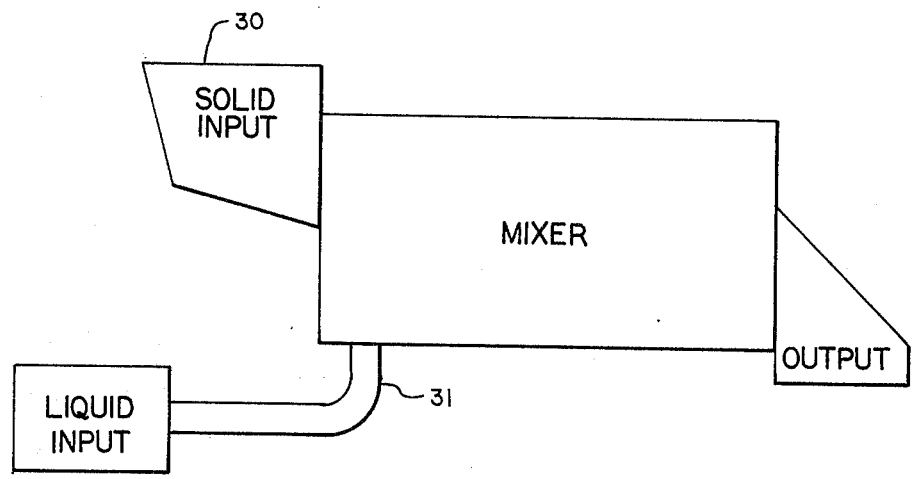
FIG. 9 is a schematic elevational view of a mixer having separate solid and liquid inputs.

Relatively dry materials, and many mixtures of solid and liquid materials, can be input together into the mixer's input axially at one end. If the materials to be processed become sticky or tacky at any stage of their mixing, then it is preferable to introduce one material axially into the mixer input, and introduce the other material radially via a pipe or conduit directly into the mixing region. This is best shown schematically in FIG. 9 where solids enter through axial input 30 and liquids enter radially through a pipe 31 axially spaced from input 30.

If possible, the material or combinations of materials input to the mixer are preferably proportioned to produce a relatively thick viscosity so that the layer built up in the stator in the mixing region has a plastic consistency and is thick enough to hold materials trapped in the layer as the mixing and working proceeds.

As the trial run proceeds, the power consumption is monitored and the effects of the run are generally observed. For example, the material can run through the mixer rapidly without drawing any power and producing an output showing that nothing much has occurred, or the material can clog up in the mixer with no output at all, accompanied by large power consumption and heat, even requiring shutting down of the mixer and opening it up to remove the material. Apart from visual observation of the input and the output, the power consumption is the most significant indicator of the events occurring in the mixer and the work done by the rotor on the material. Depending on the results of the first trial run, changes and subsequent runs are made to achieve the desired results.

Suppose, for example, that the mixer output occurs instantly after input of material, practically no power is consumed, and the output reveals no mixing. These signs indicate that no layer was formed, probably because the stator did not resist material movement sufficiently and allowed the rotor to drive the material rapidly to the output without mixing. The solution would depend somewhat on the starting parameters, and it generally requires increasing the rotor working depth. Possible remedies include increasing the total working area of the stator bars, reducing the feed predominance of the stator bars, increasing the viscosity of the layer of material, and for even greater changes, increasing the stator bar height and increasing the gap between the rotor bars and the inside surface of the stator. The solution to be tried first depends on starting parameters. For example, if minimum stator bars were used initially, the first change would be to add more stator bars. If the viscosity of the layer of material is easily increased, this would be worth trying, but sometimes it is not possible. Reducing the predominance of feed bars in the stator would be especially appropriate if the initial stator was formed with all feed bars. Stator bar height could also be increased, particularly if the initial stator used minimum bar height. A more difficult change is to increase the stator diameter to increase the radial gap between the rotor bars and the inside surface of the stator. Another way this could be done is changing from a cylindrical to a polygonal stator.

At the other extreme, there may be no output at all, an overload power consumption, and heating requiring shutdown and opening up of the mixer to prevent damage. This calls for reducing the rotor working depth and possibly decreasing the viscosity of the layer of material. Viscosity reduction, if possible, and reducing the working area of the stator bars are usually preferred as initial remedies, unless stator bars are already at a minimum or viscosity cannot be changed. Another possibility is reducing the stator bar height, especially if a stator bar height greater than the minimum was originally used. The predominance of feed bars in the stator might also be increased, unless the original stator was filled with all feed bars. This would preferably be done by eliminating retard bars, if possible, or changing retard bars to feed bars, if necessary to maintain minimum bar coverage, and it would not be done by adding more feed bars, which would increase the total working area and further impede the flow of material. The rotor working depth might also be reduced by reducing the diameter of the stator or changing from a polygonal to a circular cross section stator, because reducing the gap between the rotor bars and the inside surface of the stator reduces the stator resistance and increases the rotor's ability to move the layer through the stator bars.

Intermediate possibilities include power surges indicating that mixing work is performed in short bursts rather than substantially continuously. This calls for an increase in the rotor working depth, but not such a drastic increase as is necessary when no work is performed at all. The surges might also be eliminated by increasing the viscosity of the material, and again, the preferred solution depends on the pre-existing parameters.

If the mixer continues to draw power after input stops, this indicates too high a resistance to movement of material through the stator so that the stator retains a layer deep enough to require the rotor to continue working without being able to move the layer. The remedies can include making the material more flowable or changing the stator to reduce the rotor working depth.

In addition to adjusting the viscosity or flowability of the material being mixed, it is sometimes possible to add other materials such as thickeners, dispersants, lubricants, thixotropic or dilatent materials, or other chemicals helping to move the material through the mixer or hold the material back within the mixer, depending on which is desired. After a change in the stator, another trial run is preferred, because material runs through the mixer are relatively quick and easy, compared to making mechanical changes. Also, comparing later runs with earlier runs helps predict the changes that should be made for optimum operation.

Although it is usually possible to solve mixing problems by changes in the stator bars, it is possible that the original relationship between stator and rotor was so far out of correlation that changes in the rotor have to be made. Reducing the working area of the rotor bars reduces the rotor's grip on the material layer and allows the rotor working depth to increase so that the rotor draws more power and does more work on the material. If the opposite effect is desired, the rotor bars can be given a slight net orientation toward feed to help get the material through the mixer faster and reduce the power consumption and the work performed by the rotor. Any predominance of feed bars in the rotor should ordinarily not be more than a slight majority.

Trial runs and monitoring of power consumption continue until the power input to the mixer is proportional to the rate of material input as an indication that the layer of material is formed to a sufficient depth so that the rotor bars move through the material as they move the material circumferentially through the stator bars.

Output of material from the mixer should occur only after input of enough material to form the layer in the stator. If these conditions are observed, and the power consumption is high enough for the work to be done on the material, then the mixer is functioning properly, and the output should show the desired results.

The inventive method will ordinarily be applied in relatively high technology, industrial situations where persons skilled in the art will appreciate the many ways of experimenting and adjusting to achieve the desired results. Once the basic procedure and relationships are understood, persons skilled in the art can follow the steps schematically shown in FIG. 1 to achieve the results they desire.

I claim:

1. A method of correlating a generally cylindrical stator and rotor for working on a predetermined, high-viscosity material in the working region of a continuous mixer-refiner-reactor, said stator and rotor having confronting surfaces with discrete raised bars arranged so some of said bars feed said material and some of said bars retard said material, said method using preliminary steps of:

a. forming said rotor with said discrete bars of a total working area estimated as appropriate for forming said material into a continuous layer around said stator, giving said rotor bars a sufficient grip on said layer of material to move said layer of material generally circumferentially around said stator as a function of the input rate of said material, and making said rotor bars move through said layer of material as said layer of material moves;

b. forming said stator with said discrete bars oriented to establish a proportion of predominance of feed bars for advancing said material from the input to the output of said mixer-refiner-reactor as said circumferential movement of said material occurs;

c. forming said stator with an amount of radial gap between said rotor bars and the inside surface of said stator and with said discrete bars of a total working area and height for resisting said circumferential movement of said layer of material sufficiently so that, in response to each increment of said material input to said mixer-refiner-reactor, said layer of material is temporarily increased in depth to require said rotor bars to engage and move through said increased depth and apply working energy to said layer of material so that a given input rate establishes a rotor bar working depth in said layer of material;

d. driving the rotor of said mixer-refiner-reactor at sufficient RPM to keep said material from lodging between said rotor bars;

e. inputting said material into said mixer-refiner-reactor; and f. monitoring the power consumed by said mixer-refiner-reactor as evidence of the work done by said rotor on said layer of material; and said method comprising:

g. changing said stator bars by using at least one of a plurality of relationships between said stator bars and said rotor working depth, said relationships being responsive to input of said material into said mixer-refiner-reactor and comprising:
      1. increasing said total working area of said discrete stator bars increases said rotor working depth;
      2. increasing said height of said stator bars increases said rotor working depth;
      3. increasing said radial gap between said stator bars and the inside surface of said stator increases said rotor working depth; and
      4. decreasing said proportion of predominance of said feed bars in said stator increases said rotor working depth;

h. making said stator bar changes according to said relationships to increase said rotor working depth if said consumed power is inadequate, to increase said rotor working depth if said consumed power surges, to reduce said rotor working depth if said material clogs in said mixer-refiner-reactor and consumed power is excessive, and to reduce said rotor working depth if said consumed power continues after input of said material stops; and i. continuing with steps d–h until said consumed power is proportional to the rate of input of said material to said mixer-refiner-reactor, as an indication that said layer of material is moving through said stator bars and said rotor bars are moving through said rotor working depth of said layer of material.

2. The method of claim 1 including arranging said stator bars within said working region to prohibit any full-circle movement of said material relative to said stator bars without engaging at least one of said stator bars.

3. The method of claim 1 including arranging said rotor bars within said working region so at least one of said rotor bars extends across any axial increment of said rotor.

4. The method of claim 3 including arranging said stator bars within said working region to prohibit any full-circle movement of said material relative to said stator bars without engaging at least one of said stator bars.

5. The method of claim 1 including, in addition to steps d–h for achieving the results of step i, increasing the flowability of said material to reduce said rotor working depth, and decreasing the flowability of said material to increase said rotor working depth.

6. The method of claim 1 including making said stator polygonal in cross section with said polygonal stator having a greater resistance to said circumferential movement than a cylindrical stator having an inside diameter equal to the diameter of a circle tangent to the inside surfaces of said polygonal stator.

7. The method of claim 1 including adding viscosity-altering material to said material being worked to vary said rotor working depth.

8. The method of claim 1 including forming said rotor with said discrete bars of a maximum total working area compatible with the construction of said rotor.

* * * * *